| United States Patent [19] | [11] Patent Number: 4,529,788 |
| Asami et al. | [45] Date of Patent: Jul. 16, 1985 |

[54] PROCESS FOR PREPARING NOVEL GRAFT POLYMER

[75] Inventors: Masahiro Asami, Himeji; Kiyoshi Okitsu, Otake; Yoshiaki Okumura; Hajime Namikoshi, both of Himeji; Masatoshi Mikumo, Kobe; Shoji Watanabe, Otake, all of Japan

[73] Assignee: Daicel Chemical Industries, Ltd., Sakai, Japan

[21] Appl. No.: 550,072

[22] Filed: Nov. 8, 1983

[30] Foreign Application Priority Data

Nov. 10, 1982 [JP] Japan ................................ 57-197333

[51] Int. Cl.³ ............................................. G08G 83/00
[52] U.S. Cl. ..................................... 527/300; 536/63; 106/176

[58] Field of Search .................. 527/300, 311; 536/63; 106/176

[56] References Cited

U.S. PATENT DOCUMENTS 2,721,784 12/1955 Daul et al. .......................... 527/300
3,294,744 12/1966 Brezinski et al. ................... 527/300

Primary Examiner—John Kight
Assistant Examiner—Nathan M. Nutter
Attorney, Agent, or Firm—Flynn, Thiel, Boutell & Tanis

[57] ABSTRACT

A process for preparing a graft polymer by subjecting a cyclic ester to ring-opening polymerization in the presence of a cellulose derivative in the presence of a ring-opening polymerization catalyst for the cyclic ester. The resulting graft polymer has high transparency, good film-formability and high solubility and can be suitably used as a novel polymer material.

12 Claims, 18 Drawing Figures

THE WAVE NUMBER (cm⁻¹)

PROCESS FOR PREPARING NOVEL GRAFT POLYMER

BACKGROUND OF THE INVENTION

This invention relates to a graft polymer obtained by subjecting a cyclic ester to ring-opening polymerization in the presence of a cellulose derivative and to a process for preparing the graft polymer.

A large number of methods have been proposed in the past to make a cellulose derivative more easily processable by graft-polymerizing an unsaturated monomer such as a vinyl compound to the cellulose derivative. For example, Japanese Patent Laid-Open No. 48032/1975 discloses a process for preparing a graft copolymer by copolymerizing cellulose acetate butyrate or nitrocellulose having at least one of a copolymerizable unsaturated group and a functional group consisting of a carbon-to-hydrogen bond whose hydrogen can be withdrawn by a radical, with a polymerizable monomer. "Kobunshi Jikkengaku Dai 6 kan, Kobunshi-hanno (Polymer Experiment, Vol. 6, Polymer Reaction)", edited by Polymer Experiment Editing Committee of Polymer Society (published by Kyoritsu Shuppan, 1978), p.p. 147-192, describes a graft block reaction to a cellulose derivative together with an ordinary graft block reaction.

However, the products obtained by these reactions are primarily reaction products of addition polymerization such as radical or ionic polymerization of a polymerizable monomer and the yield of graft polymer or block copolymer with the cellulose derivative is generally extremely low.

Graft polymerization of cellulose itself has also been attempted variously and is disclosed in "Polymer Experiment, Vol. 6, Polymer Reaction", p.p. 147-192 described above or in "Koza Jugo Hanno-ron (10), Koubunshi no Kagaku Honno (1) (Lecture, On Polymer Reaction (10), Chemical Reaction of Polymer (1))" by Shin Okawara (by Kagaku Dojin, 1972), p.p. 56–74. In the graft polymerization to the cellulose itself disclosed in these references, too, the polymerizable monomer is primarily a compound that can be polymerized by addition polymerization (radical polymerization, ionic polymerization, etc) in the same way as in the case of the cellulose derivative. Only a few reports are known in which ethylene oxide, ethyleneimine or β-propiolactone is reacted with cellulose itself.

The inventors of the present invention have carried out intensive studies in order to obtain cellulose derivatives that are not known heretofore from the literature but are industrially useful and have high solubility unlike the grafted or blocked products of the cellulose derivative described above. As a result, the inventors have succeeded in producing on an industrial basis entirely novel graft polymers by subjecting a cyclic ester to ring-opening polymerization in the presence of a cellulose derivative, and have found also that the resulting graft polymer is a novel polymer material having transparency, good film formability and good solubility. Thus, the present invention is completed.

SUMMARY OF THE INVENTION

The present invention provides a process for preparing a graft polymer comprising subjecting a cyclic ester to ring-opening polymerization by adding a ring-opening polymerization catalyst to the reaction system in the presence of a cellulose derivative.

DESCRIPTION OF THE PREFERRED EMBODIMENTS

Figure 1:
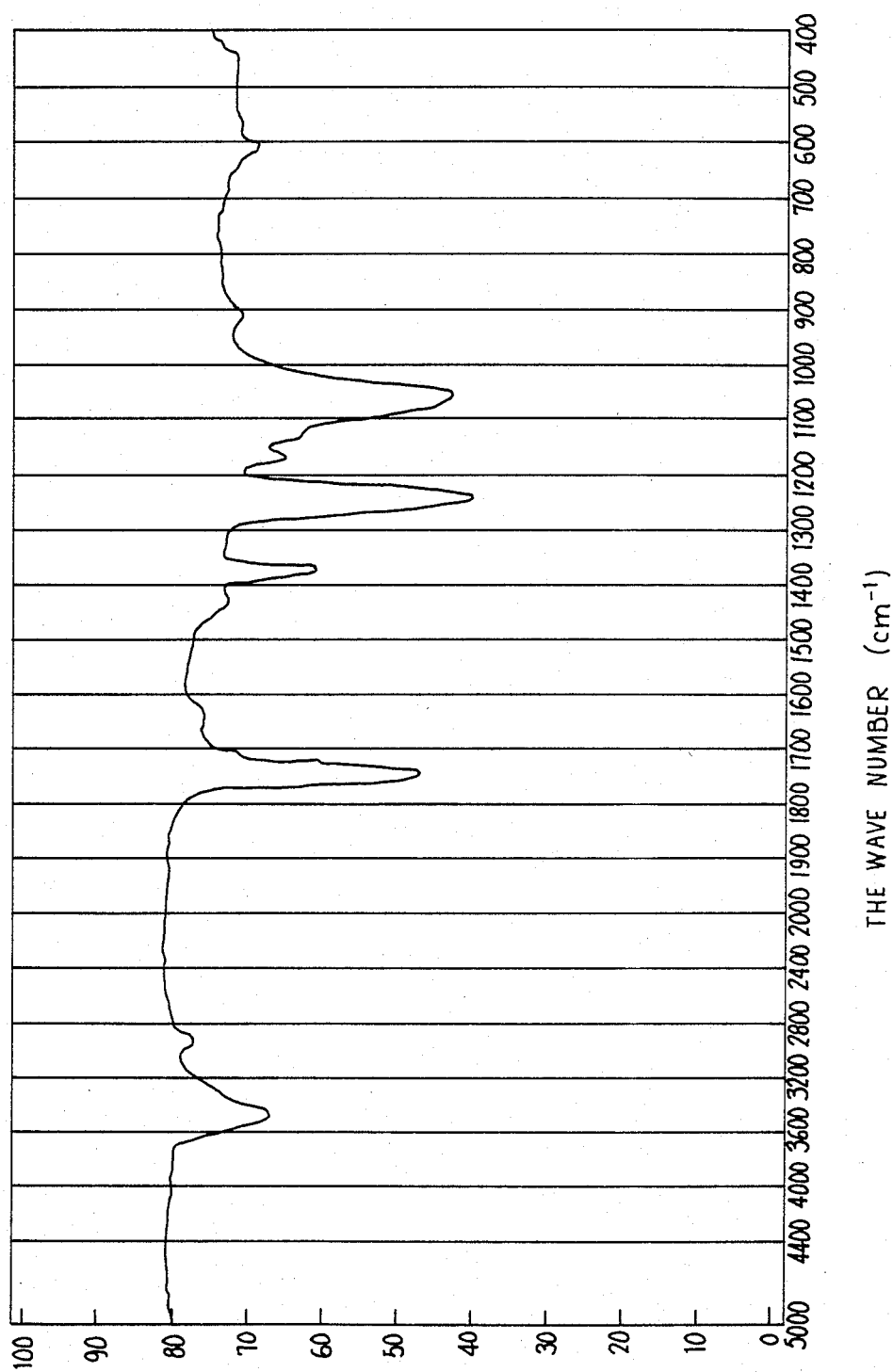
FIG. 1 is an infrared absorption spectrum of cellulose acetate used as the starting material in Example 1.

Any cellulose derivatives may be used in the present invention so long as they have a residual hydroxyl group in their molecules. Examples include cellulose esters such as cellulose acetate, cellulose acetate butyrate, cellulose acetate propionate, cellulose acetate phthalate and nitrocellulose, and cellulose ethers such as ethylcellulose, benzylcellulose, cyanoethylcellulose, hydroxyethylcellulose, methylcellulose, hydroxypropylcellulose and hydroxypropylmethylcellulose.

Among these cellulose derivatives, the cellulose esters can be preferably used in the present invention because they have good solubility in organic solvents and are relatively economical and readily available industrially. Preferred especially are cellulose acetate, cellulose acetate butyrate and cellulose acetate propionate because they are easy to handle. Among the cellulose ethers, ethylcellulose, benzylcellulose and hydroxypropylcellulose are preferred because they have good solubility in organic solvents and are readily available industrially.

In the present invention, at least one is selected from the cellulose derivatives described above.

The cyclic esters in the present invention may be those which are capable of ring-opening polymerization. Examples include β-propiolactone, α,α-dimethyl-β-propiolactone, δ-valerolactone, β-ethyl-δ-valerolactone, ε-caprolactone, α-methyl-ε-caprolactone, β-methyl-ε-caprolactone, γ-methyl-ε-caprolactone, β,δ-dimethyl-ε-caprolactone, 3,3,5-trimethyl-ε-caprolactone, enantholactone, dodecanolactone, and the like. They are also disclosed in "Koza Jugo Hanno-ron (6), Kaikan Jugo (I) (Lecture, On Polymerization Reaction (6), Ring-Opening Polymerization (1)" by Takeo Saegusa (Kagaku Dojin, 1971), p. 27. Among them, it is advantageous to use ε-caprolactone because it is relatively economical and has good compatibility with the cellulose derivatives, especially with cellulose acetate, cellulose acetate butyrate, cellulose acetate propionate, ethylcellulose, cyanoethylcellulose, benzylcellulose, hydroxypropylcellulose, and the like. In the present invention, it is possible to use only one of the cyclic esters described above or to use at least two copolymerizable cyclic esters in combination.

In the present invention, there is no particular limitation to the ratio of the cellulose derivative to the cyclic ester in order to obtain the graft polymer by subjecting the cyclic ester to the ring-opening polymerization in the presence of the cellulose derivative. However, it is generally preferred that the cellulose derivative is from 1 to 95 wt% and the cyclic ester, from 5 to 99 wt%. If the proportion of the cellulose derivative becomes high, the viscosity of the reaction system becomes remarkably high and handling becomes difficult. However, the viscosity of the system can be reduced to an easily controllable level by adding an organic solvent which does not contain an active hydrogen in its molecule and has high compatibility with both cellulose derivative and cyclic ester, such as xylene.

The catalysts to be used for the polymerization reaction of the present invention are those which are generally used for the ring-opening reaction of cyclic esters. Examples are organic acids, inorganic acids, alkali metals, such as sodium and potassium and their derivatives, tertiary amines such as pyridine, alkylaluminum and its derivatives represented by triethylaluminum, alkoxytitanium compounds represented by tetrabutyl titanate $[(C_4H_9)_4OTi]$, organometallic compounds such as tin octylate and dibutyltin laurate, and metal halides such as tin chloride. These catalysts for the ring-opening polymerization reaction are also disclosed in "Koza Jugo Hanno-ron (6), Kaikan Jugo (II) (Lecture, On Polymerization Reaction (7), Ring-Opening Polymerization (II)" by Takeo Saegusa (Kagaku Dojin, 1973), p.p. 107–131. They are also illustrated in Japanese Patent Publication Nos. 5294/1959 and 41656/1981 and Japanese Patent Laid-Open Nos. 75422/1980 and 104315/1980.

The polymerization temperature to obtain the graft polymer is one that is generally used for the ring-opening polymerization of cyclic esters. It is preferably from 120° to 230° C. and more preferably, 140° to 210° C. The reaction is carried out in a dry nitrogen atmosphere.

The reaction time depends upon the kinds and feed ratios of the cellulose derivatives and cyclic esters, the kind and quantity of the catalyst and the reaction temperature and is not limitative, in particular. However, it is generally from 0.1 to 96 hours.

The starting materials, nitrogen, reactors and the like used for obtaining the graft polymer of the present invention are preferably sufficiently dehumidified and dried.

The reaction product thus obtained contains a graft polymer and small amounts of the cellulose derivative to which no cyclic ester is grafted and a homopolymer of the cyclic ester. Even if the compatibility between the cellulose derivative and the homopolymer of the cyclic ester is not so high, the graft polymer serves as an intermediate between the ungrafted cellulose derivative and the homopolymer of the cyclic ester and improves their miscibility. Accordingly, the product becomes an apparently uniform resin. If it is desired to obtain the graft polymer alone, fractionation is carried out in a customary manner using a solvent and a non-solvent.

Daul et al. proposed in 1954 a polymer obtained by grafting β-propiolactone to cellulose itself (G. C. Daul, R. M. Reinhardt, J. D. Reid; Text. Res. J., 24, 738 (1954); ibid, 24, 744 (1954); ibid, 25, 330 (1955)). In this polymer, the terminal group of a polyester comprising β-propiolactone grafted to the cellulose is a carboxyl group. In the graft polymer obtained by the present invention, on the other hand, most of the polymerized cyclic ester is coupled (grafted) to the cellulose derivative because the hydroxyl group or other functional groups having active hydrogen present in the cellulose derivative serve as the starting point of the ring-opening polymerization of the cyclic ester during the polymerization. The chain terminal on the side opposite to the chain terminal coupled (grafted) via the hydroxyl group to the cellulose derivative of the polyester chain resulting from the ring-opening polymerization of this cyclic ester is a hydroxyl group and moreover, this hydroxyl group is spaced apart from the anhydroglucose skeleton of the cellulose derivative. For these reasons, in comparison with the starting cellulose derivative, the graft polymer of the present invention can be reacted more efficiently with compounds having functional groups capable of reacting with the hydroxyl group, such as epoxy group, isocyanate group, sulfonic acid group, acid halide structure, acid anhydride structure, and so forth.

The graft polymer of the present invention is a polymer material which has better solubility than the starting cellulose derivative and is excellent in transparency and film-formability. Accordingly, it can be used as an internal plasticizer of a cellulose derivative molding material, a molding material, a pharmaceutical material, a film material, a membrane material, polyol for polyurethane, elastomer material, paint binder, adhesive material, fibers, ink binder, anti-blocking additive for coating material, and so forth. It can also be used effectively as a miscibility improving agent between the cellulose derivative and other resins.

Now, the present invention will be described with reference to Examples thereof.

The "part" and "%" in Examples are "part by weight" and "% by weight (wt%)" unless specified otherwise.

EXAMPLE 1

100 parts of cellulose acetate (produced by Daicel Chemical Industries, LTD., acetyl contents 31.8%, degree of substitution 1.74), 244.4 parts of ε-caprolactone (5.04 mol per glucose unit) and 55 parts of xylene were charged into a reactor equipped with a stirrer, a thermometer and a reflux condenser, and cellulose acetate was uniformly dissolved while heating the reaction system to 90° C. 30 parts of xylene containing 0.0024 part of tetrabutyl titanate was added while stirring was being continued and, after the reaction mixture was stirred sufficiently, it was reacted at 150° C. for 20 hours.

As a result, a pale yellow transparent graft polymer was obtained.

After acetone was added to the graft polymer to dissolve it, it was precipitated in carbon tetrachloride.

Figure 2:
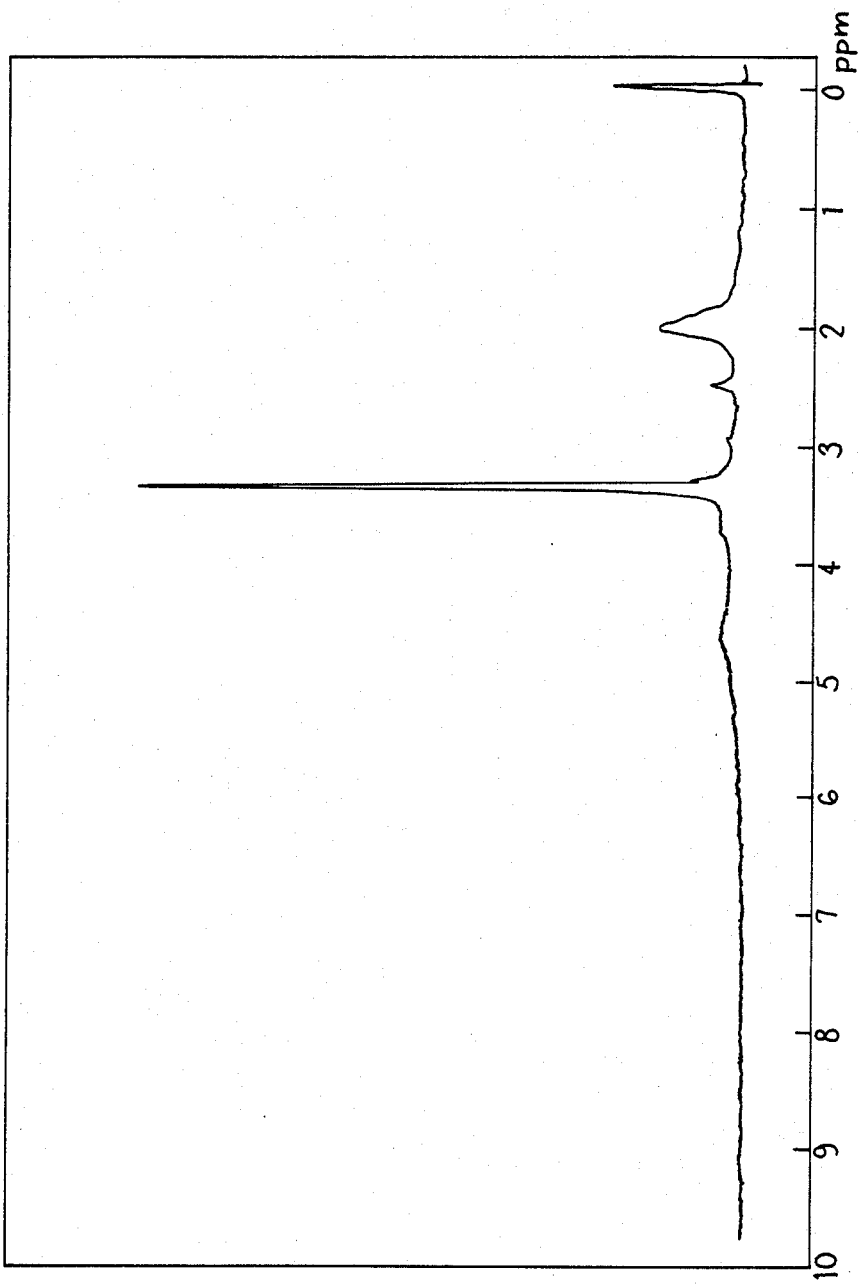
FIG. 2 is a proton NMR spectrum of cellulose acetate.
Figure 3:
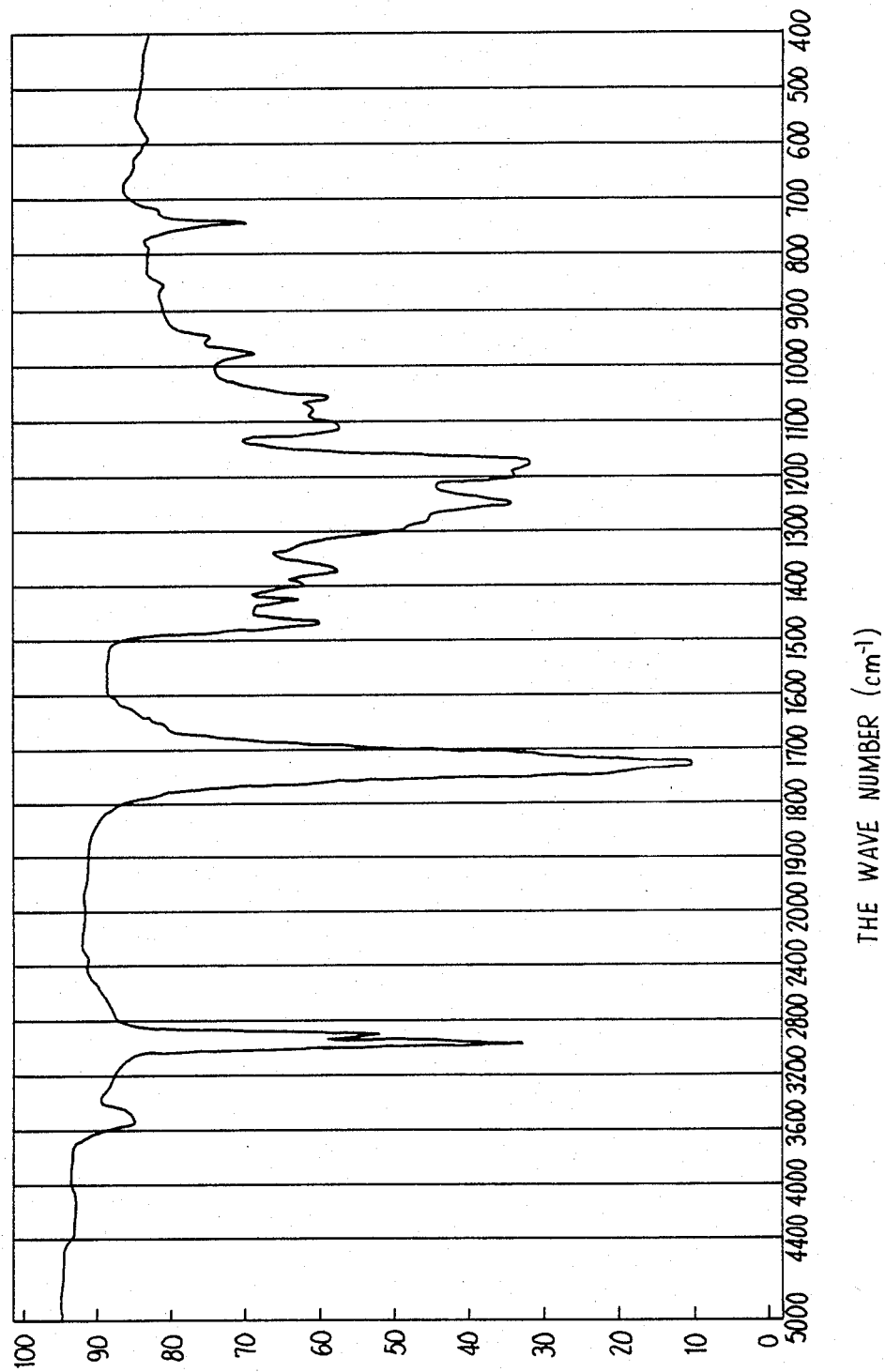
FIG. 3 is an infrared absorption spectrum of a polycaprolactone homopolymer.

The resulting solid was collected and vacuum-dried. The product was extracted for 10 hours with carbon tetrachloride using a Soxhlet extractor, but this polymer was not dissolved in carbon tetrachloride with the exception that 0.3% of polycaprolactone homopolymer was obtained from the extract. This polymer was completely dissolved in acetone though the starting cellulose acetate was not dissolved in acetone. From this, this polymer could be confirmed as a graft polymer. The infrared absorption spectrum and proton NMR spectrum (solvent $CD_3SOCD_3$) were shown in FIGS. 1 and 2, respectively. The infrared absorption spectrum of the polycaprolactone obtained by extraction was shown in FIG. 3.

Figure 4:
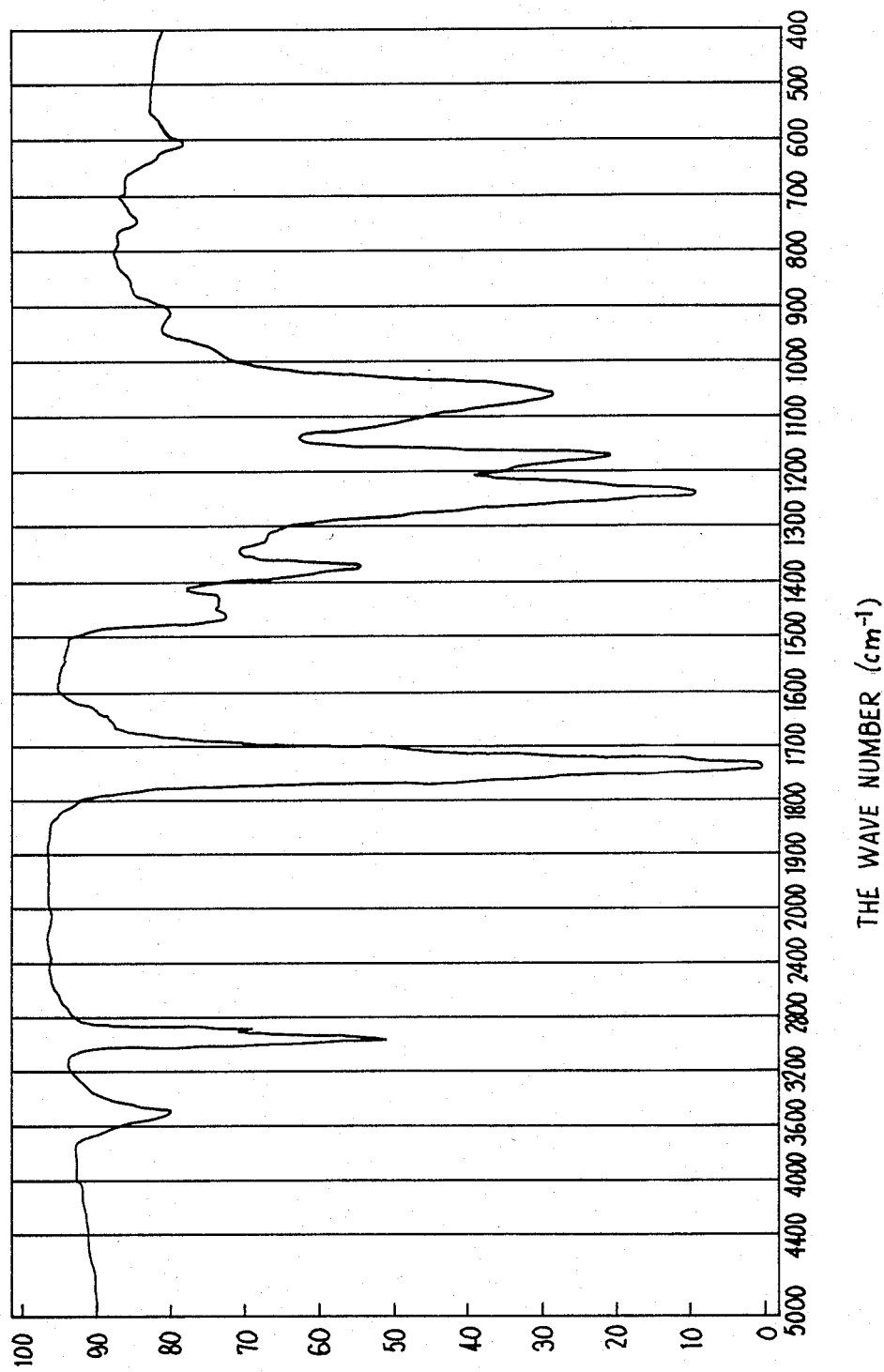
FIG. 4 is an infrared absorption spectrum of the graft polymer obtained in Example 1.
Figure 5:
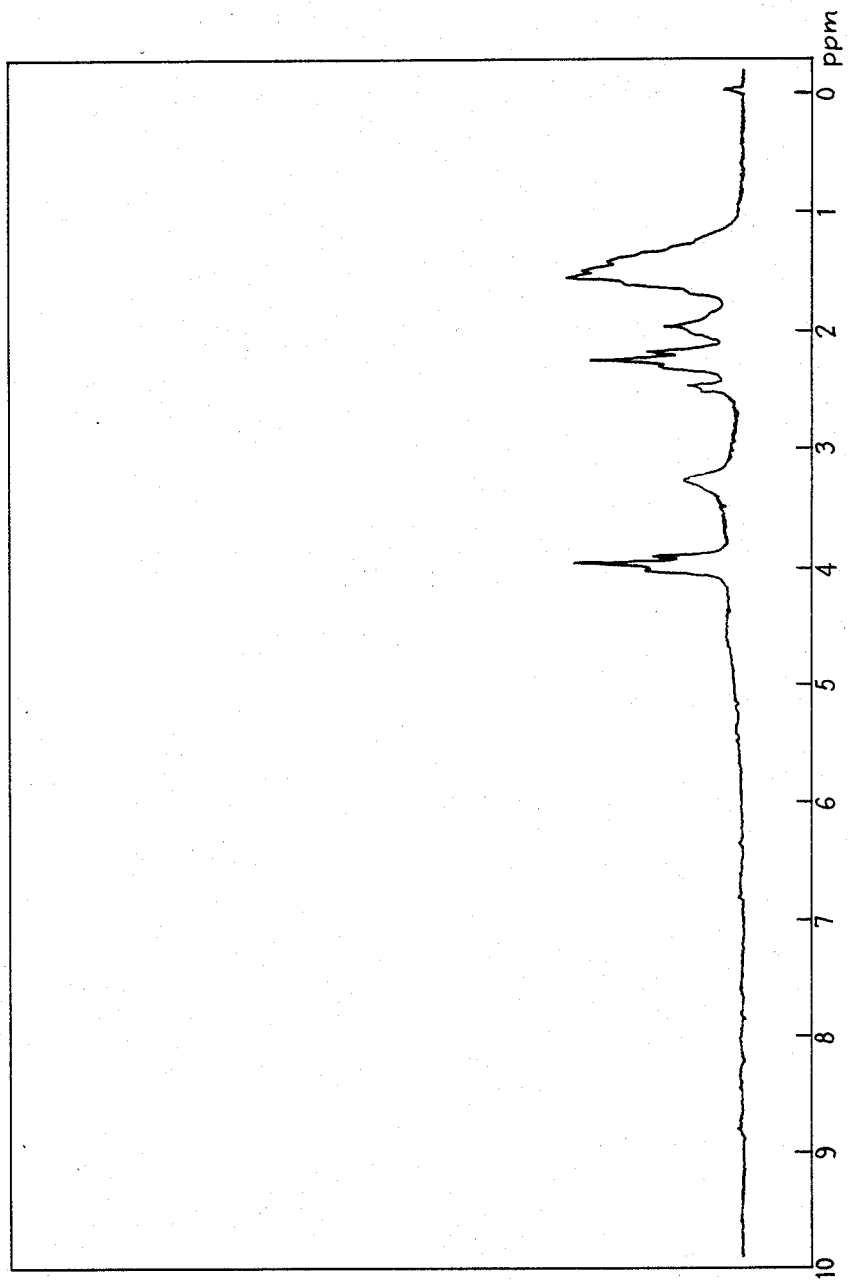
FIG. 5 is a proton NMR spectrum of the same graft polymer.

The infrared absorption spectrum and proton NMR spectrum (solvent $CD_3SOCD_3$) of the resulting graft polymer were shown in FIGS. 4 and 5, respectively. In comparison with the starting cellulose acetate, the absorption due to C-H stretching vibration of the methylene group at about 2,800 to about 3,000 cm$^{-1}$ and the rise of the absorption due to C=O stretching vibration of the ester group at about 1,700 to 1,760 cm$^{-1}$ were observed in the graft polymer from the infrared absorption spectrum (the absorption due to O-H stretching vibration at about 3,400 to about 3,600 cm$^{-1}$ being used as the reference).

In the proton NMR spectrum, peaks at 3.8 to 4.2 ppm were assigned to the methylene proton at position 5 of ε-caprolactone

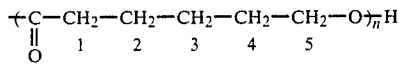

that was ring-opened and esterified, while peaks at 2.1 to 2.4 ppm were assigned to the methylene proton at positions 2, 3 and 4. Peaks at 1.8 to 2.1 ppm were assigned to the methylene proton of the acetyl group. The proton of the cellulose skeleton gave broad absorption at 3 to 5.4 ppm. The molar ratio of the ring-open polymerized caprolactone to the acetyl group determined from the ratio of the methyl protons at positions 2, 3 and 4 to that of the acetyl group was 2.06:1.

The content of the ester group, that was determined by titrating the graft polymer after sponification, was 0.00804 mol/g and the ester group calculated from this molar ratio was acetyl group with DS of 1.56 per glucose unit and caprolactone unit with MS of 3.21.

EXAMPLE 2

200 parts of ε-caprolactone and 0.0036 part of tetrabutyl titanate [$(C_4H_9O)_4Ti$] were charged into a reactor equipped with a stirrer, a thermometer and a reflux condenser and sufficiently dried, in a dried nitrogen atmosphere. The reaction system was heated to 120° C. 100 parts of cellulose acetate (produced by Daicel Chemical Industries, LTD., acetyl contents 39.6%, degree of substitution 2.43) that was sufficiently dried in advance was slowly added and was stirred until the mixture became substantially homogeneous. Thereafter, the temperature was raised to 170° C. and the reaction was continued at this temperature for 16 hours.

Thus, a yellow transparent graft polymer was obtained.

When measured using acetone, the intrinsic viscosity of this graft polymer was found to be [η]=0.75 l/g at 30° C.

Figure 6:
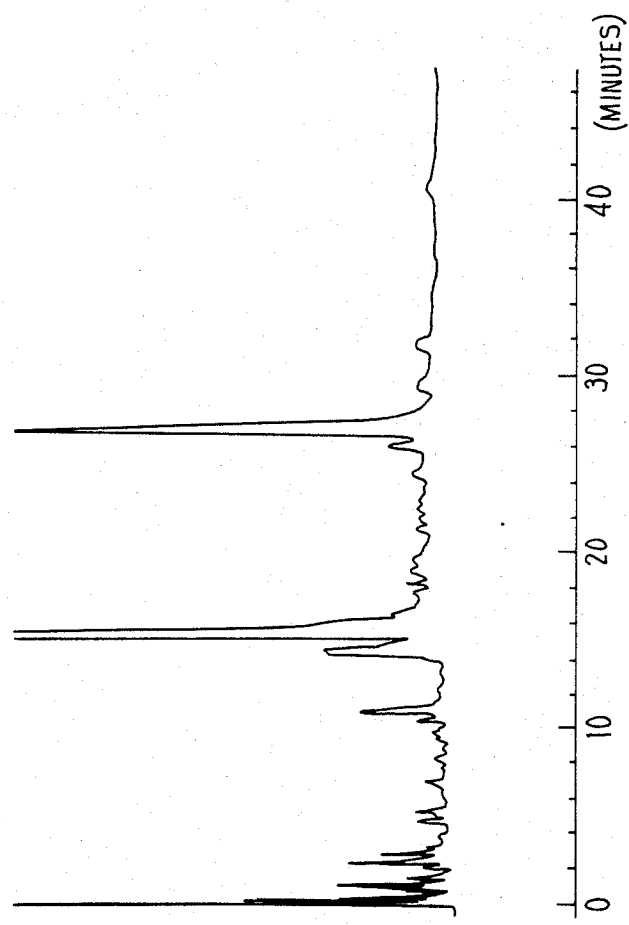
FIG. 6 is a pyrolysis gas chromatogram of the graft polymer obtained in Example 2 after fractionation.

Next, 5 parts of the graft polymer was dissolved in 25 parts of acetone and, while the solution was stirred, 600 parts of benzene was added to precipitate the polymer. After sufficiently dried in a vacuum drier, the polymer was again dissolved in acetone and benzene was added in large excess in the same way as described above to precipitate the polymer. After sufficiently dried, the polymer was subjected to pyrolysis gas chromatography (thermal decomposer; Curie Point Pyrolyzer JHP-2, produced by Nippon Bunseki Kogyo K.K., thermal decomposition temperature 590° C., thermal decomposition time 3 seconds; gas chromatographic apparatus, Gas Chromatography JGC-20K, produced by Nippon Denshi Kogyo K.K., column PEG 20M 10%/Chromosorb W-AW (stainless column 2 cm), column temperature 70° to 230° C. (8°/min rise ratio), carrier gas, helium, 60 ml/min; detector FID). As shown in FIG. 6, the peak due to the polyester structure of ε-caprolactone (developing time 27 to 28 min) was observed. The peak observed at the developing time of 15 to 16 minutes resulted from the acetyl group in cellulose acetate.

Figure 7:
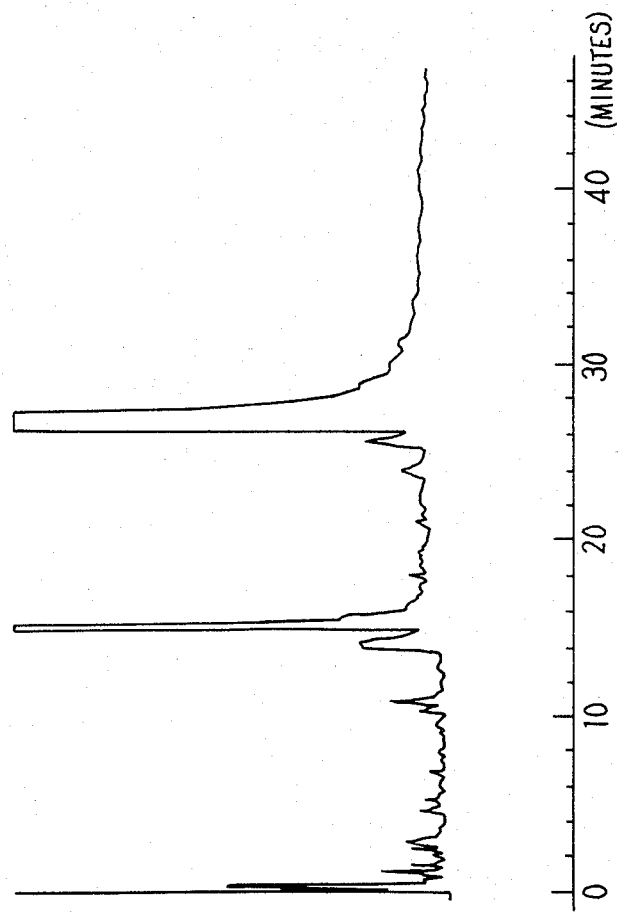
FIG. 7 is a pyrolysis gas chromatogram of the same graft polymer before fractionation.
Figure 8:
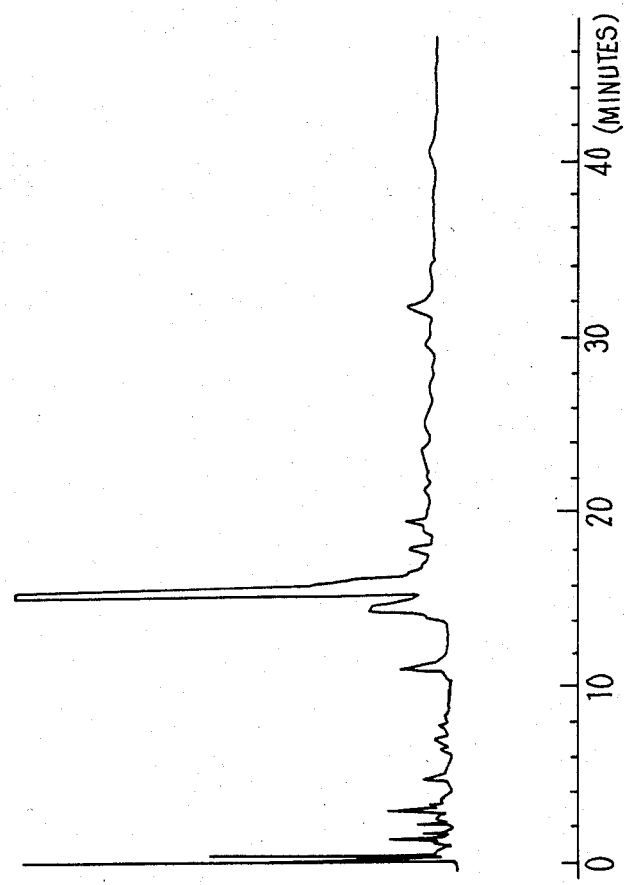
FIGS. 8 and 9 are pyrolysis gas chromatograms of cellulose acetate as the starting material and a 1:2 blend (weight ratio) of cellulose acetate and ε-caprolactone homopolymer, respectively.
Figure 9:
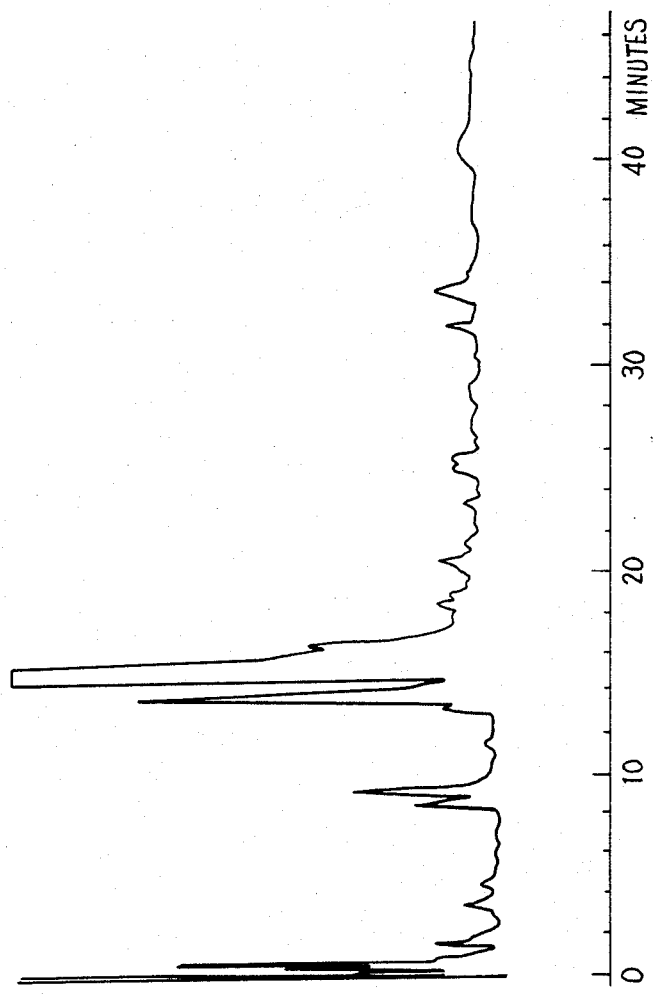

Incidentally, FIG. 7 is a pyrolysis gas chromatogram of the graft polymer before fractionation and FIG. 8 is that of cellulose acetate. FIG. 9 is a pyrolysis gas chromatogram of the polymer measured by pyrolysis gas chromatography under the condition described above, the polymer being prepared by subjecting 5 parts of a 1:2 (weight ratio) blend of cellulose acetate and ε-caprolactone to the same procedures described above, that is, by dissolving the blend in 25 parts of acetone, then adding 600 parts of benzene while stirring the solution to precipitate the polymer, and subjecting the dried polymer thus obtained to pyrolysis gas chromatography. The peak due to the polyester structure of ε-caprolactone could not be observed in the pyrolysis gas chromatogram of FIG. 9 as in FIG. 8.

This was because FIG. 6 is the pyrolysis gas chromatogram of the graft polymer while FIG. 9 is that of the blend, or, in other words, the polycaprolactone portion of the blend was dissolved in benzene and thereby removed completely to leave cellulose acetate alone, whereas the grafted polycaprolactone portion (polyester portion) of the graft polymer cannot be removed by benzene.

The graft polymer fractionated by the method described above was completely dissolved in chloroform in which the starting cellulose acetate was not dissolved, and its intrinsic viscosity measured at 30° C. using acetone was [η]=0.98 l/g.

Figure 10:
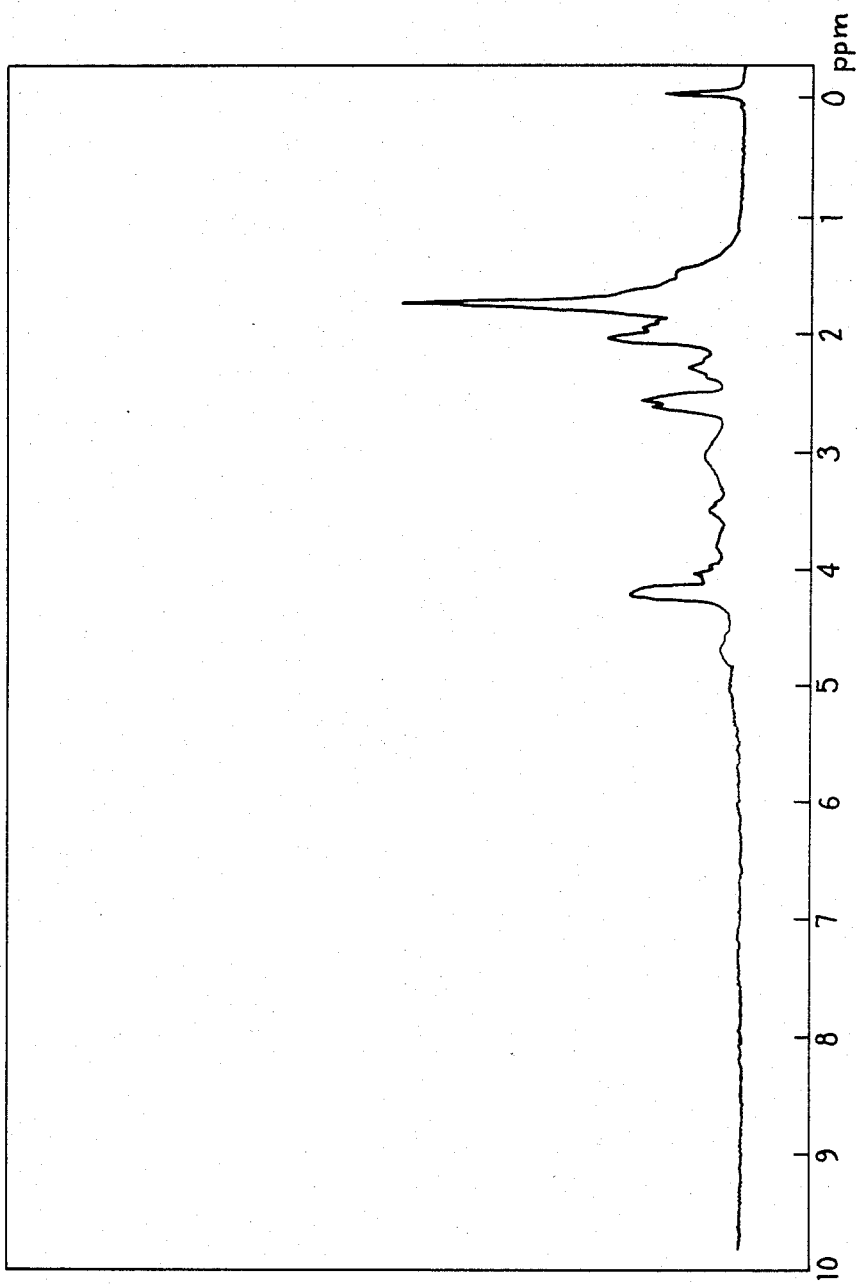
FIG. 10 is a proton NMR spectrum of the graft polymer obtained in Example 2 after fractionation.

FIG. 10 shows the chart of this fractionated graft polymer when measured by a proton NMR (NMR absorption spectrograph; MH-100, produced by Nippon Denshi K.K., 100 MHz, measuring temperature 25° C.) using heavy acetone ($CD_3COCD_3$) as the solvent.

Among the protons of the polyester

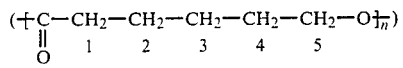

formed by the ring-opening polymerization of ε-caprolactone, the methylene protons at positions 5, 1 and 2 to 4 were observed at 3.9 to 4.3 ppm, 2.1 to 2.7 ppm and 1.3 to 1.9 ppm, respectively. Signals at 1.8 to 2.2 ppm were assigned to the methyl proton of the acetyl group.

Figure 11:
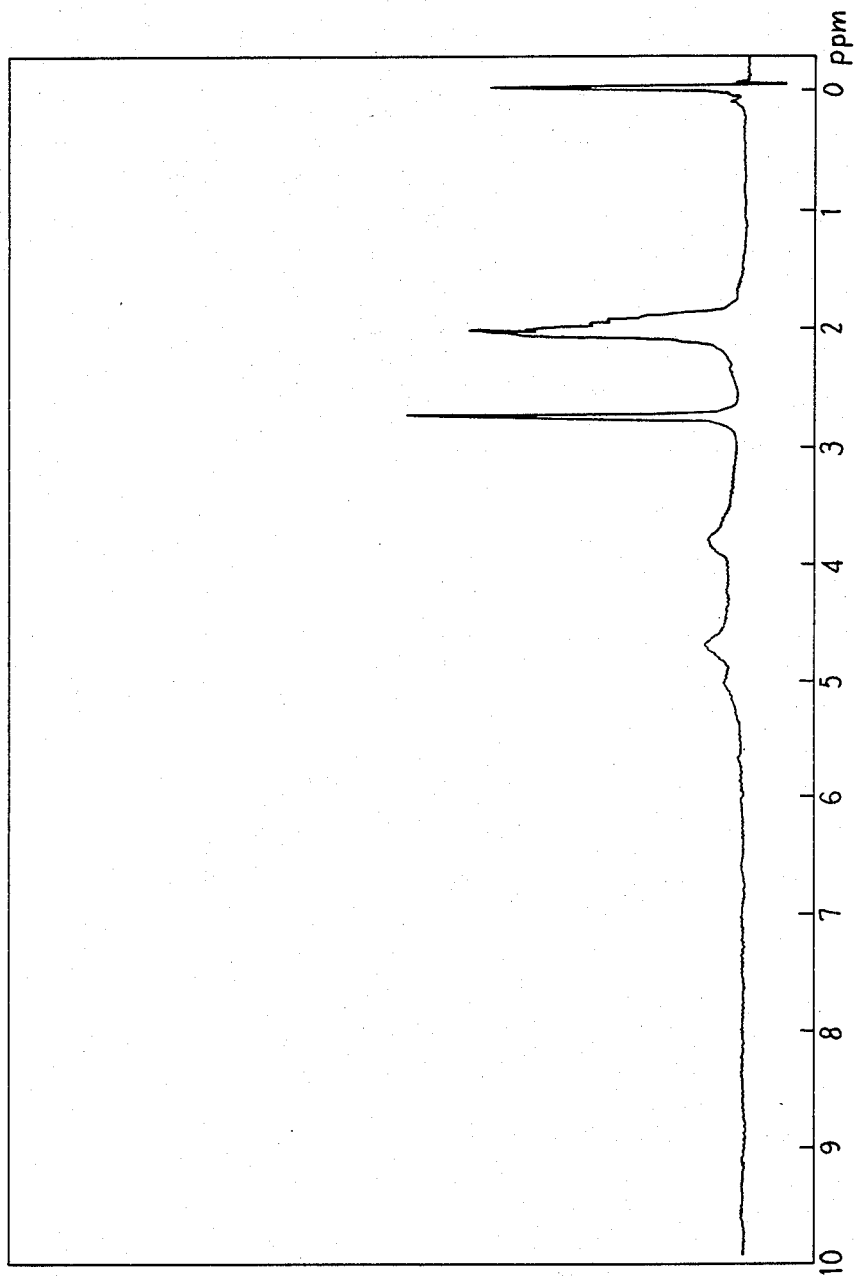
FIGS. 11 and 12 are proton NMR spectrum of the starting cellulose acetate and polycaprolactone homopolymer, respectively.
Figure 12:
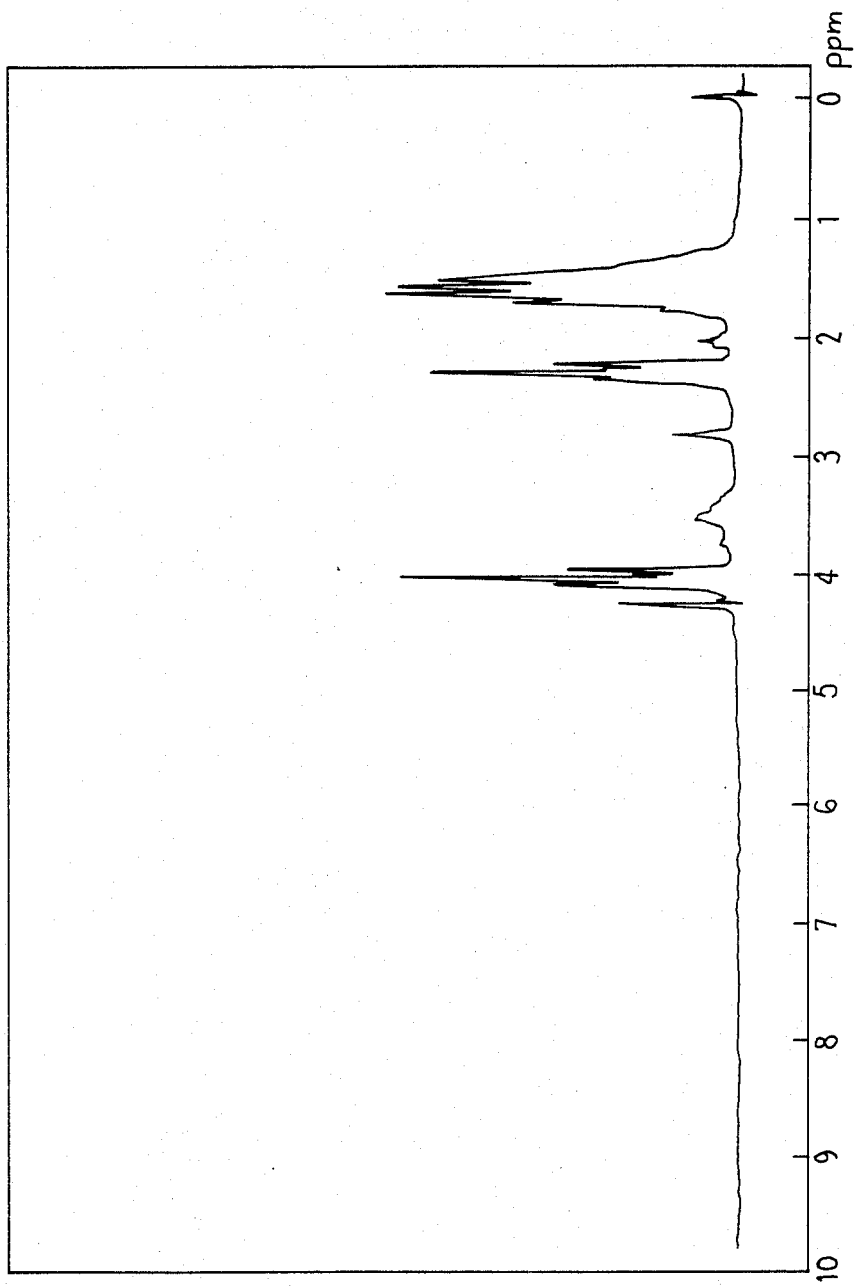

FIG. 11 is an NMR chart of the starting cellulose acetate having an acetylation degree of 55.2% and FIG.

12 is that of the polycaprolacton homopolymer that were measured under the same condition as described above.

The graft polymer fractionated as described above was dissolved in acetone and a film was produced by a casting method. This film was more transparent than that produced from a 1:2 (weight ratio) blend of the starting cellulose acetate and the homopolymer of ε-caprolactone under the same condition as above and was by far more flexible than that produced from the starting cellulose acetate under the same condition as above.

Figure 13:
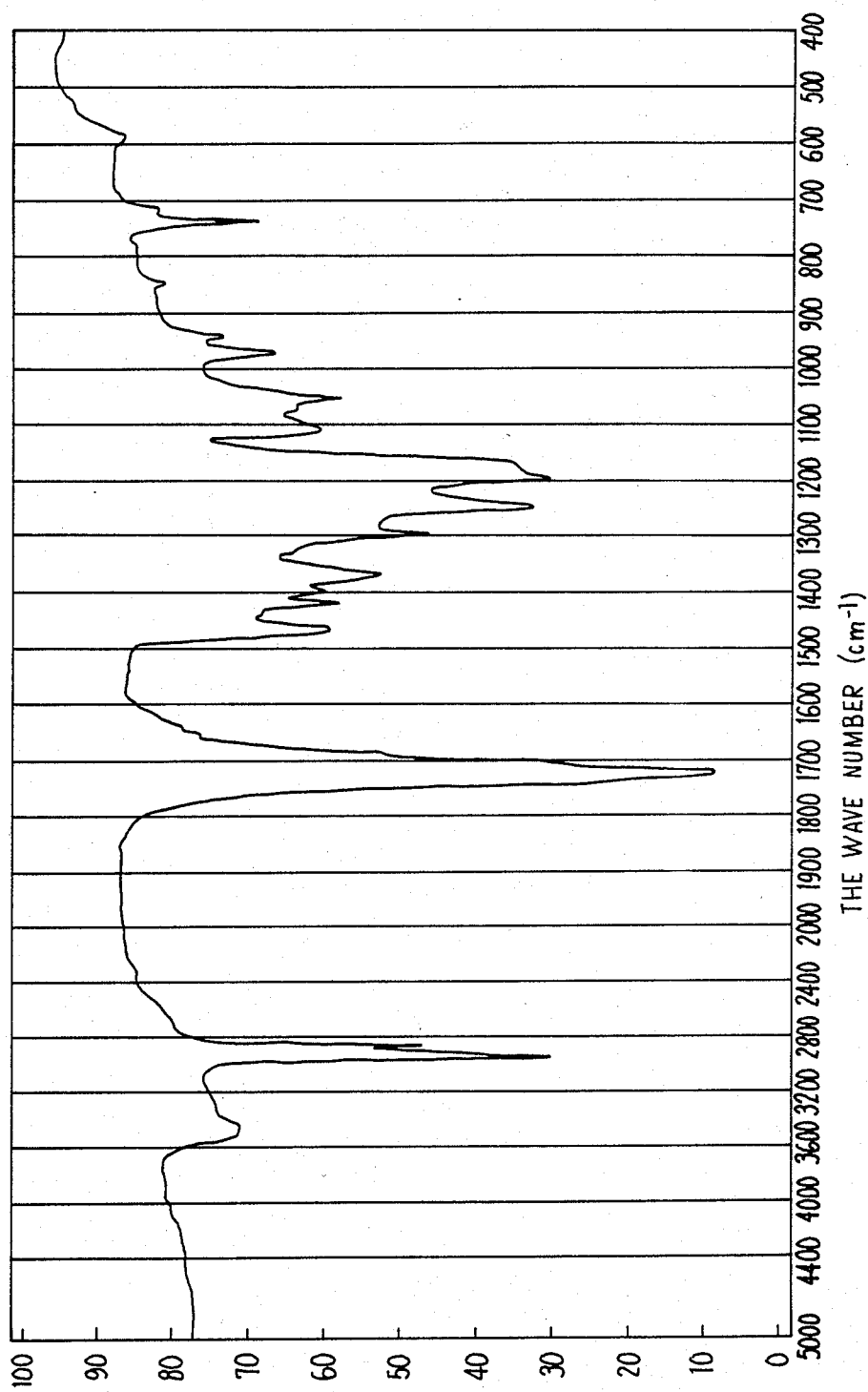
FIGS. 13, 14, 15 and 16 are infrared absorption spectrum of the graft polymer obtained in Example 2 after fractionation, the starting cellulose acetate, poly-ε-caprolactone and a 1:2 blend of polycaprolactone and starting cellulose acetate, respectively.
Figure 14:
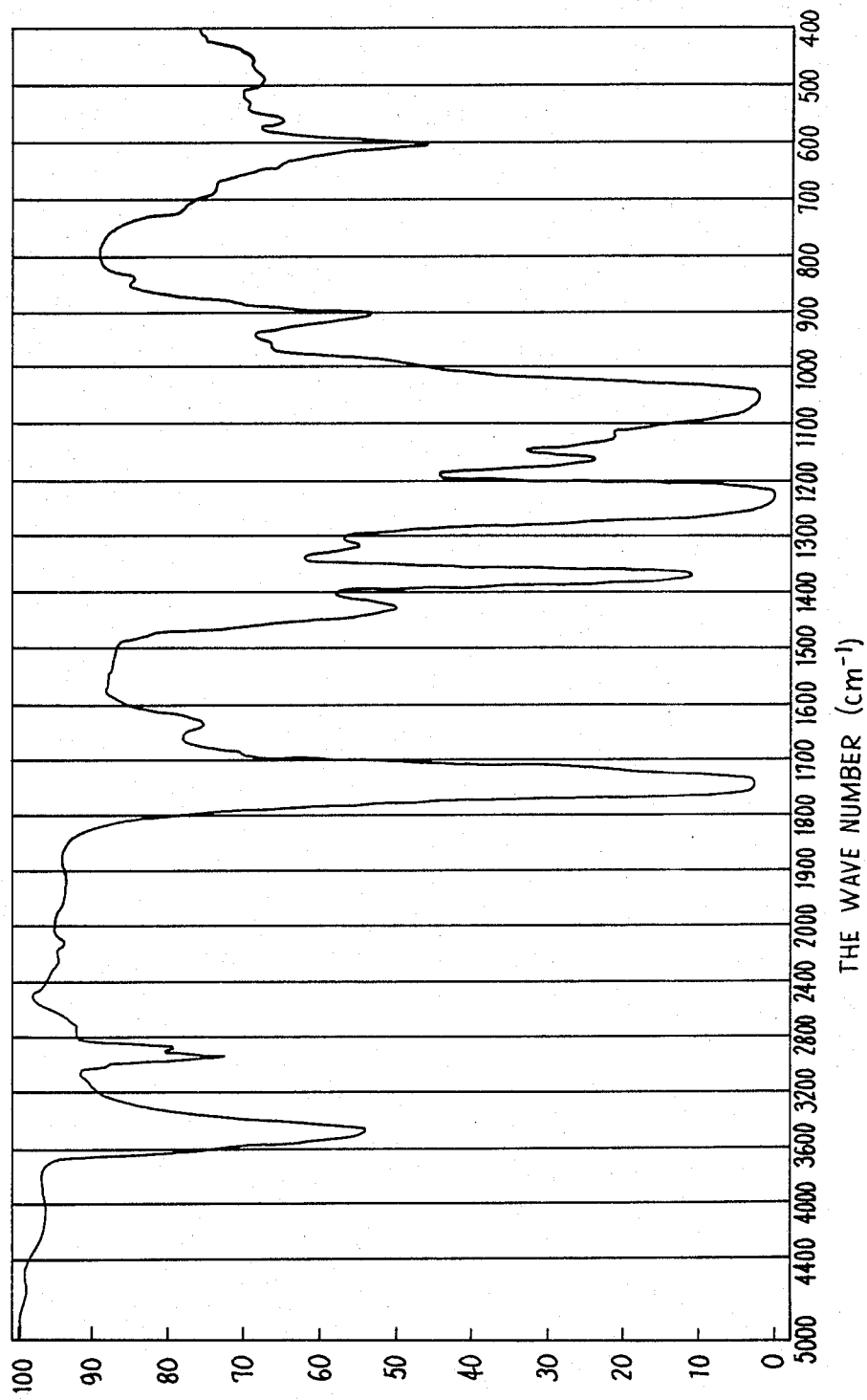

FIG. 13 is a chart of the film of the graft polymer fractionated as described above, while FIG. 14 is that of the film of the starting cellulose acetate, both measured with an infrared absorption spectrograph (Type A-3; Nippon Bunko K.K.).

Figure 15:
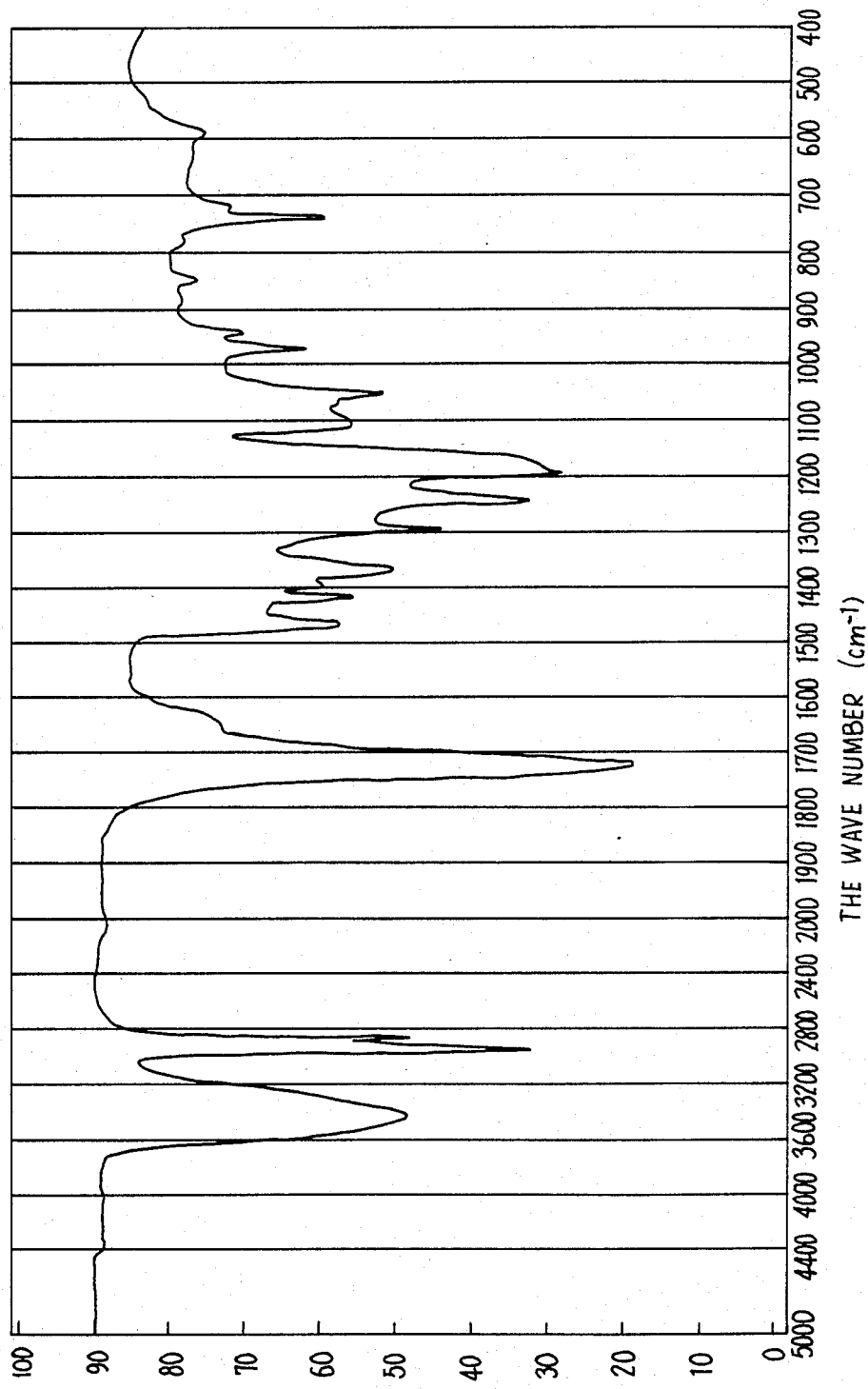
Figure 16:
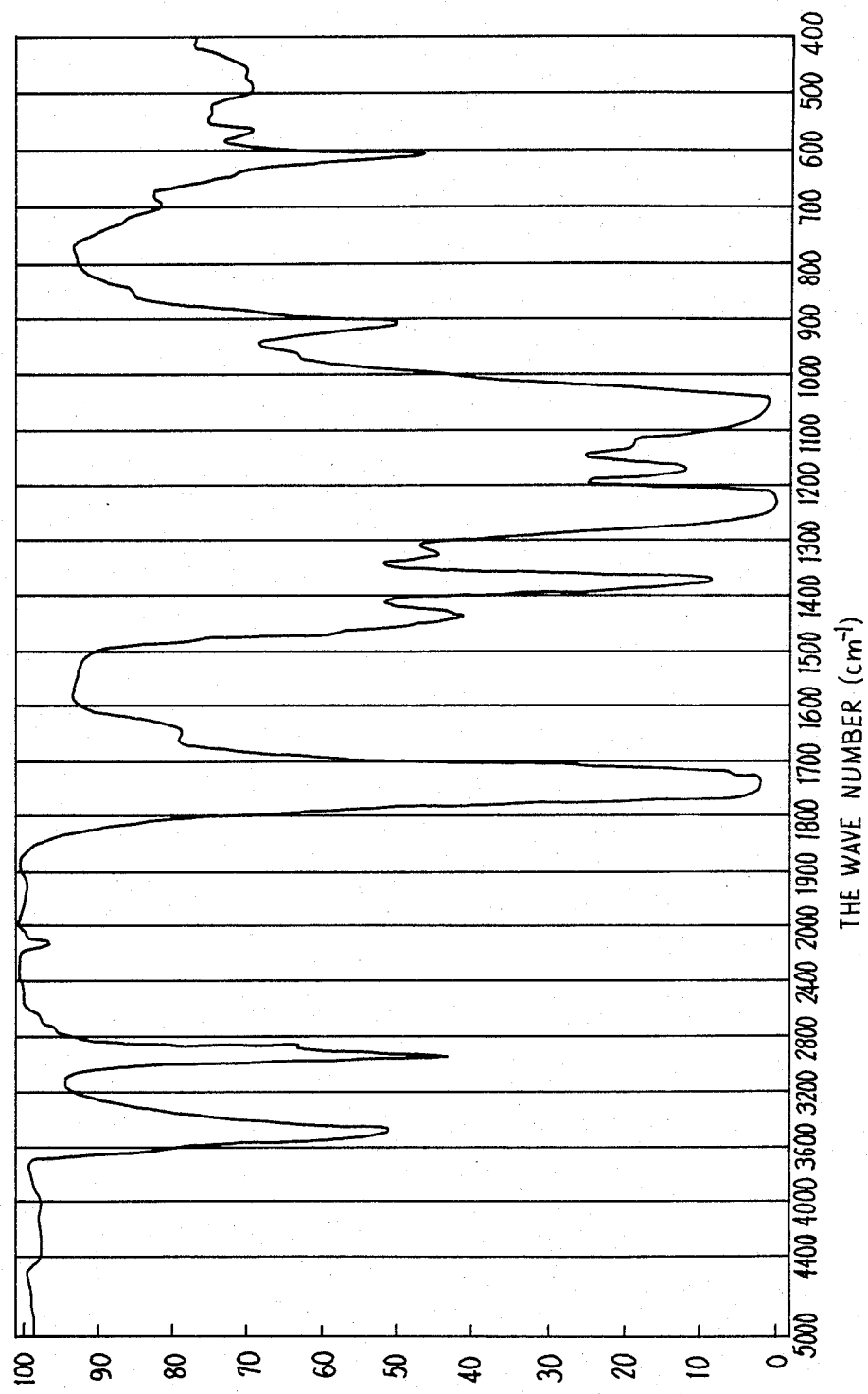

FIGS. 15 and 16 show infrared absorption spectra of the poly-ε-caprolactone and the 1:2 (weight ratio) blend of the poly-ε-caprolactone and starting cellulose acetate, both measured under the same condition as described above, respectively.

In comparison with cellulose acetate, the absorption due to C-H stretching vibration of the methylene group that was observed at about 2,800 to 3,000 cm$^{-1}$ and the increase of the absorption ratio (with the absorption due to O-H stretching vibration observed at about 3,400 to 3,600 cm$^{-1}$ being used as the reference) due to C=O stretching vibration of the ester group observed at about 1,720 to 1,730 cm$^{-1}$ (which was also observed in the infrared absorption spectrum of poly-ε-caprolactone of FIG. 15) were observed in the graft polymer thus fractionated.

On the other hand, the acid value of the graft polymer fractionated by the method described above was below 1. Thus, the chain terminal of the polyester structure portion of the graft polymer was found to be a hydroxyl group.

EXAMPLE 3

100 parts of ε-caprolactone and 0.001 part of tin chloride (SnCl$_2$) were charged into the same reactor as used in Example 1 in a dry nitrogen atmosphere and heated to 120° C. 200 parts of cellulose acetate butyrate (CAB 551-0.2, a product of Eastman Chemical Co.) sufficiently dried in advance was slowly added and the mixture was stirred until it became substantially homogeneous. Thereafter, the temperature was raised to 150° C. and the reaction was continued for 14 hours.

A dense yellow transparent graft polymer was obtained. The intrinsic viscosity of this graft polymer measured at 30° C. using acetone was [η]=0.62 l/g.

Figure 17:
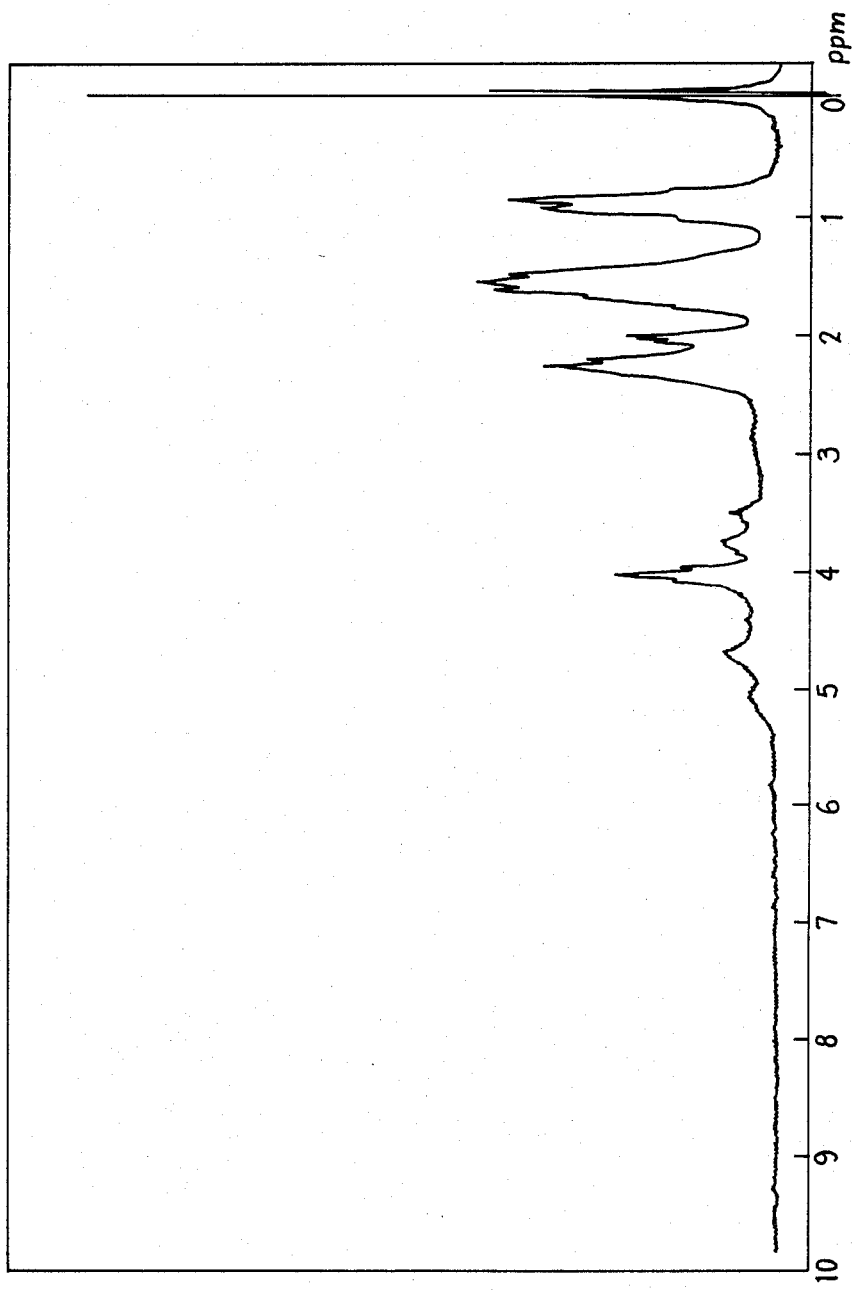
FIG. 17 is a proton NMR spectrum of the graft polymer obtained in Example 3.

FIG. 17 is a proton NMR chart of the graft polymer. In this chart, signals at 0.8 to 1.1 ppm were assigned to the methyl proton of the butyryl group of cellulose acetate butyrate; those at 1.4 to 1.8 ppm to the methylene proton of the caprolactone portion and to that of the butyryl group of cellulose acetate butyrate; those at 2.0 to 2.1 ppm to the methyl proton of the acetyl group of cellulose acetate butyrate; those at 2.1 to 2.5 ppm to the methylene proton adjacent to the carbonyl group of the caprolactone portion and to that adjacent to the carbonyl group of the butyryl group of cellulose acetate butyrate; those at 3.9 to 4.1 ppm to the methylene proton adjacent to the oxygen of the caprolactone portion; and broad signals at about 2.5 to 5.4 ppm to the proton of the glucose skeleton of cellulose acetate butyrate.

EXAMPLE 4

75 parts of ε-caprolactone, 0.0015 part of tetrabutyl titanate and 100 parts of xylene were charged into the same reactor as used in Example 1 in a dry nitrogen atmosphere and the mixture was heated to 120° C. 150 parts of cellulose acetate butyrate (CAB-551-0.2, a product of Eastman Chemical Co.) sufficiently dried in advance was slowly added and the mixture was stirred until it became substantially homogeneous. Thereafter, the temperature was raised to 145° C. and the reaction was continued for 20 hours. A yellow transparent graft polymer was obtained. The intrinsic viscosity of the resulting graft polymer, when measured at 30° C. using acetone, was found to be [η]=0.68 l/g.

Figure 18:
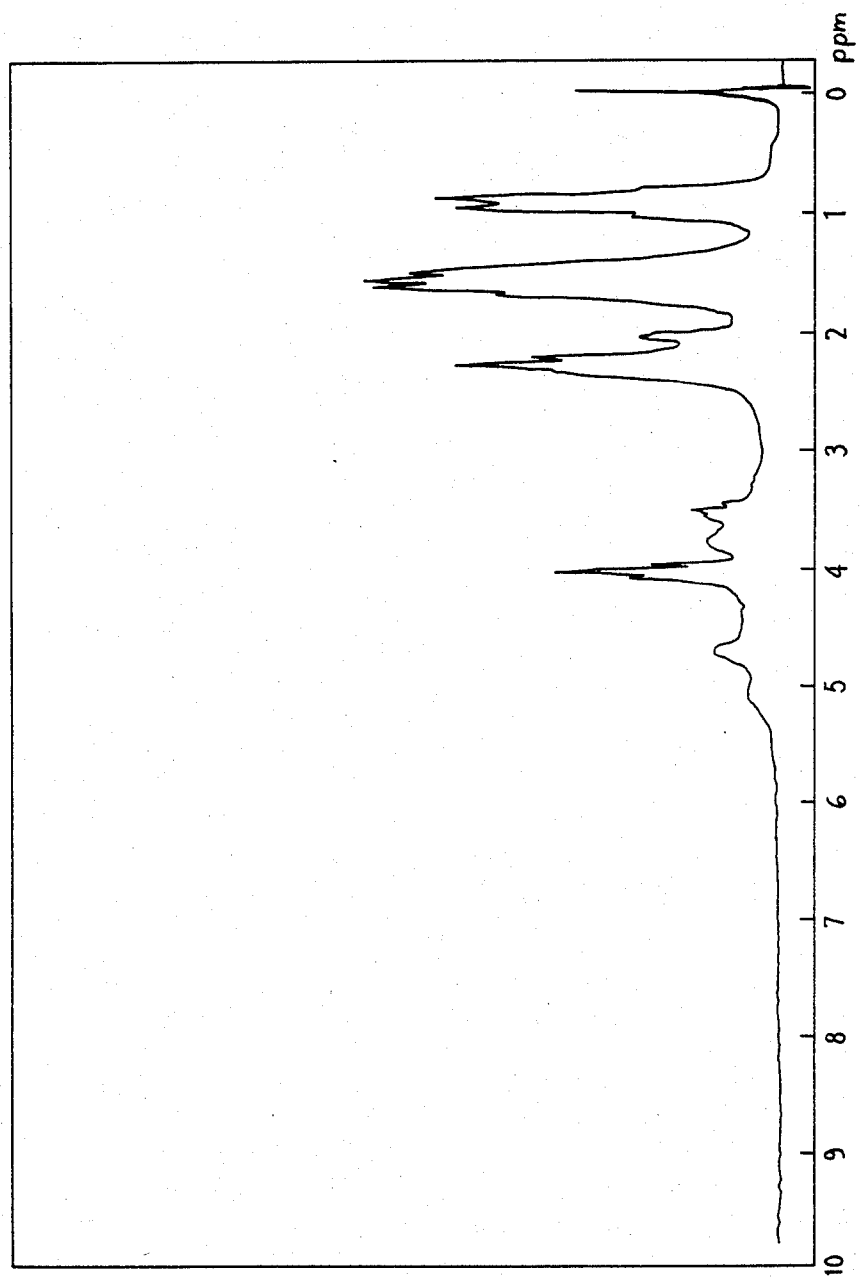
FIG. 18 is a proton NMR spectrum of the graft polymer obtained in Example 4.

FIG. 18 is a proton NMR chart of this graft polymer. In this diagram, too, signals due to the protons present in the cellulose acetate butyrate and the caprolactone portion were observed in the same way as in FIG. 17.

EXAMPLE 5

100 parts of ethylcellulose ("Ethocel MED 50", tradename of Dow Chemical Co., ethoxyl substitution degree (DS) of 2.3), 141 parts of ε-caprolactone (2.8 mol per glucose unit) and 55 parts of xylene were charged into a reactor equipped with a stirrer, a thermometer and a reflux condenser. The mixture was heated to 90° C. to uniformly dissolve ethylcellulose.

While stirring was being continued, 30 parts of xylene containing 0.00244 part of tetrabutyl titanate was added and was sufficiently stirred. Thereafter, the reaction was carried out for 14 hours at 145° C.

As a result, a somewhat brownish graft polymer was obtained.

After xylene was evaporated, the dried graft polymer was dissolved in xylene, acetone and the like but the starting ethylcellulose was insoluble in these solvents. Thus, grafting was confirmed.

EXAMPLE 6

100 g of cellulose acetate (produced by Daicel Chemical Industries, LTD., acetyl contents 39.2%, degree of substitution 2.39), 66.4 g of ε-caprolactone (1.53 mol per glucose unit) and 73.1 g of xylene were charged to a reactor equipped with a stirrer, a thermometer and a reflux condenser and the mixture was heated to 140° C. to uniformly dissolve cellulose acetate.

While stirring was being continued, 4 g of xylene containing 0.664 mg of tetrabutyl titanate was added and the reaction was carried out with stirring for 18.5 hours at 140° C.

As a result, a pale yellow transparent graft polymer was obtained.

Acetone was added to this polymer to dissolve it, which was then precipitated in carbon tetrachloride. The resulting solid was vacuum dried. The resulting product was extracted using a Soxhlet extractor with carbon tetrachloride for 10 hours, but this polymer was not dissolved in carbon tetrachloride with the exception that a small amount of polycaprolactone homopolymer was obtained from the extract. The starting cellulose acetate was not dissolved in chloroform but this graft polymer was uniformly dissolved. When this substance was saponified using caustic soda, it had an esterification rate of 0.008646 eq/g. The molar ratio of the acetyl group of the caprolactone unit obtained from a proton NMR spectrum was 7:4.16 and the degree of substitution determined from this ratio was an acetyl group DS of 2.17. The molar number of addition of caprolactone (MS) was 1.29.

What is claimed is:

1. A process for preparing a graft copolymer which comprises: forming a substantially homogeneous reaction mixture consisting essentially of (1) a lactone selected from the group consisting of β-propiolactone, α,α-dimethyl-β-propiolactone, δ-valerolactone, β-ethyl-δ-valerolactone, ε-caprolactone, α-methyl-ε-caprolactone, β-methyl-ε-caprolactone, γ-methyl-ε-caprolactone, β,δ-dimethyl-ε-caprolactone, 3,3,5-trimethyl-ε-caprolactone, enantholactone and dodecanolactone, (2) an effective amount of a catalyst for effecting the ring-opening polymerization reaction of said lactone, and (3) a cellulose derivative selected from the group consisting of cellulose esters and cellulose ethers, said cellulose derivative having a residual hydroxyl group in the molecule and being dissolved in said lactone; then subjecting said reaction mixture to polymerization conditions effective to cause ring-opening polymerization of said lactone, whereby to obtain a graft copolymer in which a polymer derived from the ring opening of said lactone is grafted to said cellulose derivative.

2. A process according to claim 1 in which the terminal of said polymer of said lactone that is remote from the anhydroglucose skeleton of said cellulose derivative is a hydroxyl group.

3. A process according to claim 1 in which said cellulose derivative is selected from the group consisting of cellulose acetate, cellulose acetate butyrate, cellulose acetate propionate, ethylcellulose, cyanoethylcellulose, benzylcellulose and hydroxypropylcellulose.

4. A process according to claim 1 in which said lactone is ε-caprolactone.

5. A process according to claim 3 in which said lactone is ε-caprolactone.

6. A process according to claim 1 in which the weight ratio of said cellulose derivative/said lactone is from 1/99 to 95/5, and the polymerization temperature is from 120° to 230° C.

7. A process for preparing a graft copolymer which comprises: forming a substantially homogeneous reaction mixture consisting essentially of (1) a lactone selected from the group consisting of β-propiolactone, α,α-dimethyl-β-propiolactone, δ-valerolactone, β-ethyl-δ-valerolactone, ε-caprolactone, α-methyl-ε-caprolactone, β-methyl-ε-caprolactone, γ-methyl-ε-caprolactone, β,δ-dimethyl-ε-caprolactone, 3,3,5-trimethyl-ε-caprolactone, enantholactone and dodecanolactone, (2) an effective amount of a catalyst for effecting the ring-opening polymerization reaction of said lactone, (3) a cellulose derivative selected from the group consisting of cellulose esters and cellulose ethers, said cellulose derivative having a residual hydroxyl group in the molecule, and (4) an organic solvent which does not contain an active hydrogen in its molecule and has a high compatability with said cellulose derivative and said lactone, said cellulose derivative and said lactone being dissolved in said solvent; then subjecting said reaction mixture to polymerization conditions effective to cause ring-opening polymerization of said lactone, whereby to obtain a graft copolymer in which a polymer derived from the ring opening of said lactone is grafted to said cellulose derivative.

8. A process according to claim 7 in which the terminal of said polymer of said lactone that is remote from the anhydroglucose skeleton of said cellulose derivative is a hydroxyl group.

9. A process according to claim 7 in which said cellulose derivative is selected from the group consisting of cellulose acetate, cellulose acetate butyrate, cellulose acetate propionate, ethylcellulose, cyanoethylcellulose, benzylcellulose and hydroxypropylcellulose.

10. A process according to claim 7 in which said lactone is ε-caprolactone.

11. A process according to claim 9 in which said lactone is ε-caprolactone.

12. A process according to claim 7 in which the weight ratio of said cellulose derivative/said lactone is from 1/99 to 95/5, and the polymerization temperature is from 120° to 230° C.

* * * * *